United States Patent [19]

Stang et al.

[11] 3,838,559

[45] Oct. 1, 1974

[54] FRUIT HARVESTING MACHINE

[75] Inventors: Elden J. Stang; Ervin L. Denisen, both of Ames, Iowa

[73] Assignee: Iowa State University Research Foundation, Ames, Iowa

[22] Filed: Oct. 24, 1972

[21] Appl. No.: 299,939

[52] U.S. Cl. .......................................... 56/327 R
[51] Int. Cl. ............................................ A01d 45/00
[58] Field of Search ............ 56/327 R, 328, 330, 30, 56/33, 34, 35, 119, 104; 171/55, 57, 27, 28; 13/5

[56] References Cited
UNITED STATES PATENTS

| | | | |
|---|---|---|---|
| 1,233,089 | 7/1917 | Maglathlin | 56/330 |
| 1,300,620 | 4/1919 | Joy | 171/57 X |
| 1,533,644 | 4/1925 | Gebhardt | 56/330 |
| 1,716,769 | 6/1929 | Friend | 56/33 |
| 1,962,668 | 6/1934 | Olney | 56/328 R X |
| 2,458,782 | 1/1949 | Hyman et al. | 56/104 X |
| 2,801,659 | 8/1957 | Carter | 130/5 J |
| 2,832,187 | 4/1958 | Johnson | 56/207 |
| 2,927,414 | 3/1960 | Jones | 56/104 |
| 3,040,507 | 6/1962 | Lasswell, Jr. | 56/328 R |
| 3,077,720 | 2/1963 | Grove et al. | 56/328 R |
| 3,407,580 | 10/1968 | Murray | 56/328 R |
| 3,451,200 | 6/1969 | Phares | 56/33 |
| 3,527,035 | 9/1970 | Byrd | 56/119 |

*Primary Examiner*—Russell R. Kinsey
*Attorney, Agent, or Firm*—Zarley, McKee & Thomte

[57] ABSTRACT

A fruit harvesting machine comprises a picker head frame having forward and rearward ends, at least one pair of elongated tips each having forward and rearward ends and being rotatably mounted on the picker head frame, and means for rotating each of the picker tips along their longitudinal axes. The picker tips are formed from an elongated body made of plastic flexible material and having helical ribs formed on the outer surface thereof. The picker tips are rotated in a direction whereby the helical ribs cooperate to engage the fruit positioned between the pair of tips and to move the fruit rearwardly and upwardly. Pins protrude from the forward ends of the picker tips and are rotatably journaled in cone-shaped guards which spread the forward ends of the picker tips so that they diverge outwardly with respect to one another.

2 Claims, 6 Drawing Figures

3,838,559

FRUIT HARVESTING MACHINE

The present invention relates to a fruit harvesting machine and particularly to a machine for harvesting strawberries.

The harvesting of strawberries is difficult to do mechanically because of the fragile nature of the berries, and because the berries are located close to the ground. The berries must be plucked from the stems and carried to a bin without damaging them or bruising them.

The present invention contemplates the use of a plurality of longitudinal fingers or picker tips placed in side by side relation and having helical ribs on the outer surface thereof. The picker tips are made of soft pliable material, and are rotated so that the helical ribs pluck the berries from the stems and lift them upwardly and rearwardly onto a conveyor.

Therefore, a primary object of the present invention is the provision of a device which will harvest strawberries mechanically.

A further object of the present invention is the provision of a device which will minimize damage to the strawberries during the picking process.

A further object of the present invention is the provision of a device which will pluck the strawberries from the stems and carry them away to a bin without cutting, bruising or otherwise damaging them.

A further object of the present invention is the provision of a device which includes rotating picker tips and means for preventing the strawberries from becoming entangled between the rotating picker tips.

A further object of the present invention is the provision of a device which includes rotating picking tips which pluck, lift, and gently carry away the strawberries without damaging them.

A further object of the present invention is the provision of a device which is simple in construction, economical in manufacture, and durable in use.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
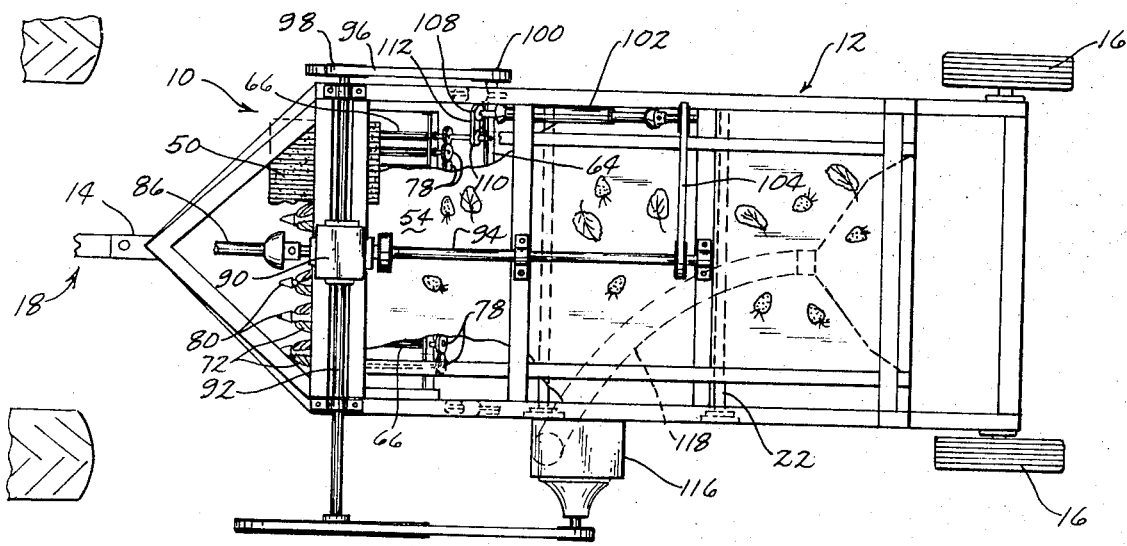
FIG. 1 is a plan view of the fruit harvesting machine of the present invention.
Figure 2:
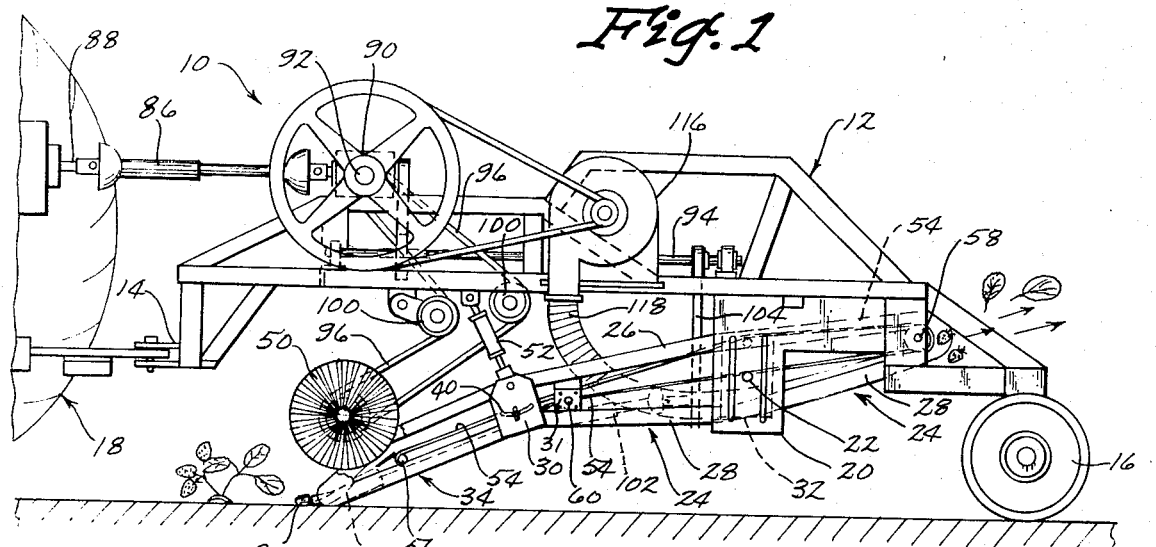
FIG. 2 is an elevational view of the device shown in FIG. 1.
Figure 4:
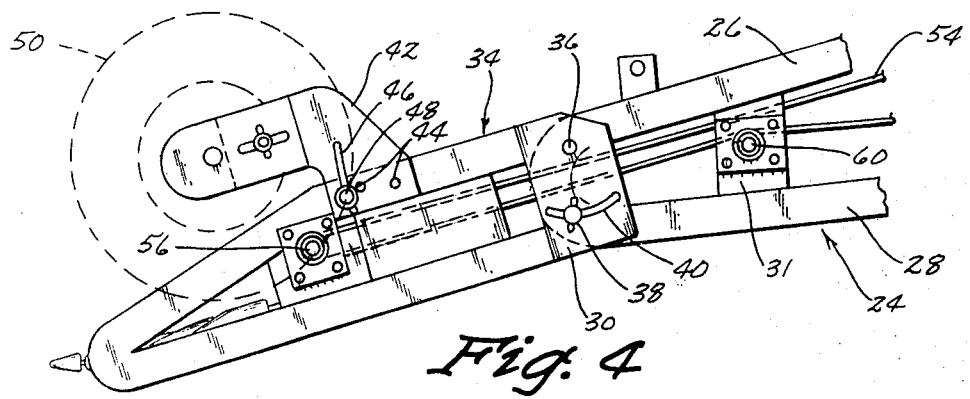
FIG. 4 is a view similar to FIG. 3 showing the frame on which the elements of FIG. 3 are mounted.

Referring to the drawings, the fruit harvesting machine of the present invention is generally designated by the numeral 10. Machine 10 includes a body frame 12 having a plurality of members which are supported at their forward ends by a hitch 14 and at their rearward ends by a wheel and axle assembly 16. Hitch 14 is adapted to be mounted to a tractor 18 as shown in FIGS. 1 and 2. Frame 12 includes, at its opposite sides, two downwardly extending support plates 20 which have a pivot axle 22 extending therebetween. Pivotally mounted on axle 22 between plates 20 is a picker head frame 24 having an upper frame member 26 and a lower frame member 28. Innerconnecting upper and lower frame members 26, 28 are plates 30, 31, 32. Plate 32 is rotatably mounted upon pivot axle 22 so as to provide a pivotal axis for frame 24 about axle 22. A forward frame member 34 is pivotally mounted to the forward end of picker head frame 24 by means of pins 36 (FIG. 4). A wing nut 38 extends through an arcuate slot 40 in the rear end of forward frame 34, thus providing means for adjusting the angle at which forward frame 34 is disposed with respect to picker head frame 24. Extending upwardly and forwardly from forward frame 34 is a pair of brush arms 42 which also include a pivot pin 44, an arcuate slot 46, and wing nut 48 for adjusting the angle of disposition of brush arms 42. An elongated cylindrical brush 50 is rotatably mounted between arms 42. A hydraulic adjustment cylinder 52 innerconnects plate 30 of picker head frame 24 and body frame 12, so as to permit the adjustment of picker head frame 24 about pivot axle 22.

Referring to FIG. 2, a conveyor belt 54 is trained around a forward roller 56 and a rearward roller 58. A take-up roller 60 takes up the slack in conveyor belt 54.

Figure 3:
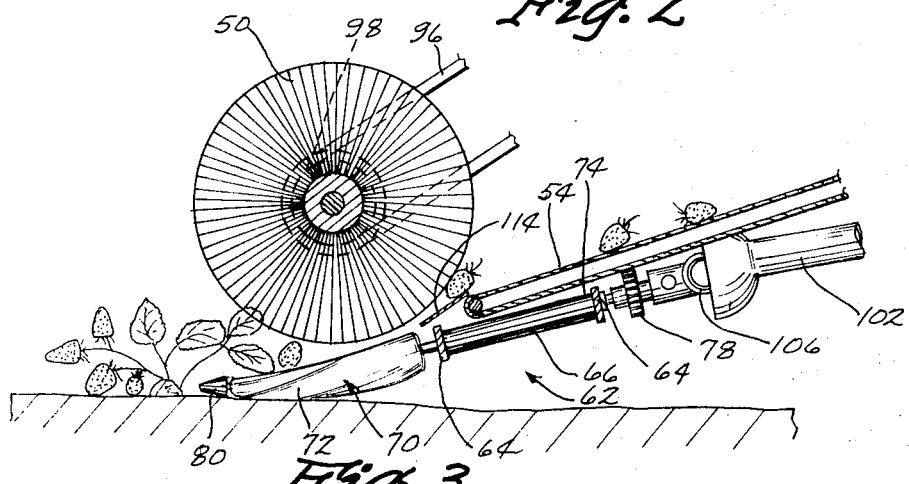
FIG. 3 is an enlarged view of the forwardmost end of the picker tip assembly.
Figure 5:
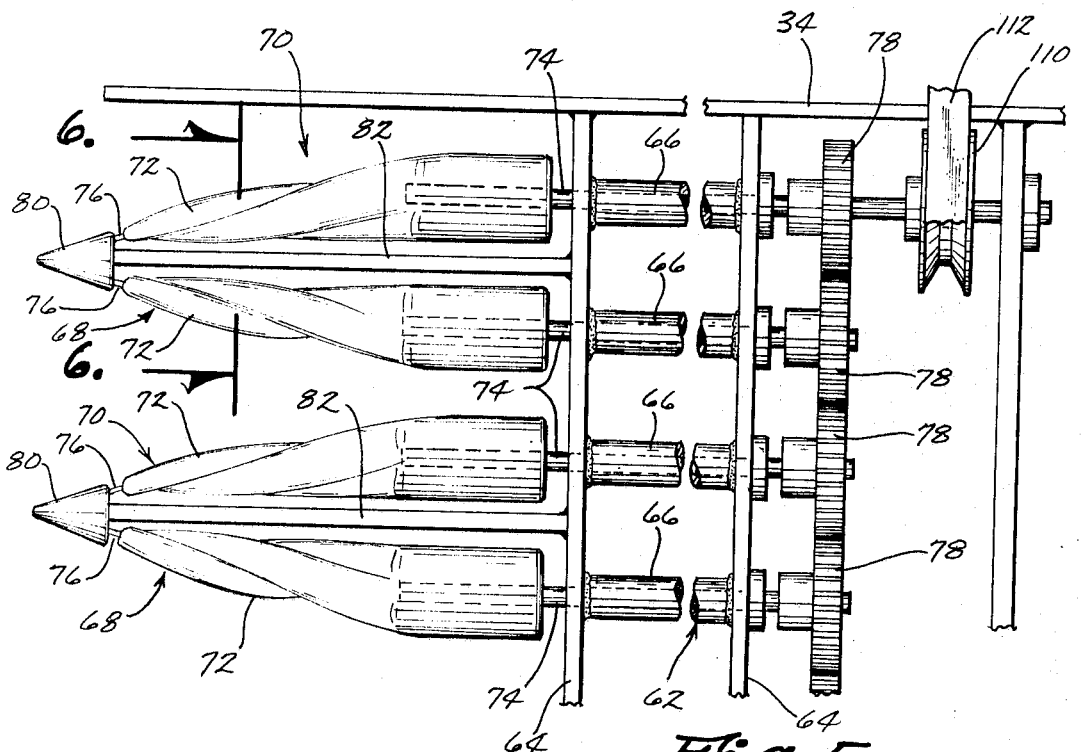
FIG. 5 is a top enlarged view of the picker tips which are used on the forward end of the present invention.

Extending transversely across forward frame 34 is a bearing assembly 62 (FIGS. 3 and 5). Bearing assembly 62 includes two cross members 64 which extend transversely across the forward frame 34. Welded between cross members 64 and extending therebetween are a plurality of cylindrical bearing members 66 which are adapted to rotatably receive a shaft therein. A plurality of picker tips are arranged in pairs with one member of each pair being designated by the numeral 68 and with the other member of each pair being designated by the numeral 70. Each picker tip 68, 70 includes an elongated plastic or elastic body member 72 having a shaft 74 embedded within its rearward end and extending outwardly therefrom, and having a pivot pin 76 embedded in its forward end and protruding forwardly therefrom. Shafts 74 rotatably extend through bearing members 66, and include gears 78 at their rearward ends. Gears 78 are innermeshing with one another so that every other shaft 74 rotates in an opposite direction in response to rotation of one of gears 78. Pivot pins 76 at the forward ends of body members 72 are rotatably journaled within a cone-like guard or shield 80 which is supported forwardly of the forward ends of body members 72 by means of an elongated support member 82 which is welded to forward cross member 64 and extends forwardly therefrom. Referring to FIG. 5, it will be noted that each shield 80 rotatably receives a pin 76 from picker tip 70 and a pin 76 from picker tip 68. It will be further noted that shield 80 causes the forward ends of picker tips 68, 70 to be bent or deflected toward one another.

Figure 6:
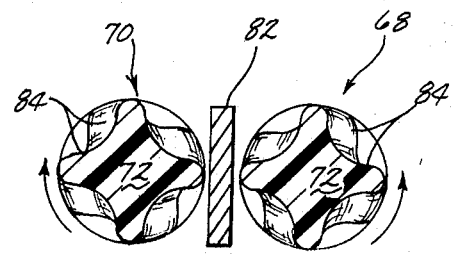
FIG. 6 is a sectional view taken along line 6 — 6 of FIG. 5.

Bodies 72 of picker tips 68, 70 are made of a flexible resilient material which will permit them to deflect along their longitudinal axes, and which will provide a resilient surface for engaging the strawberries to be picked. The outer surfaces of body members 72 include helical ribs 84 on their outer surfaces. As can be seen in FIG. 6, the threaded arrangement of ribs 84 on picker 68 is opposite from the threaded direction of ribs 84 on picker tip 70. The rotational direction of picker tips 68, 70 is such that ribs 84 move downwardly when they are adjacent support member 82, and ribs 84 move upwardly when they are positioned away from support member 82. Picker tips 68, 70 may be fabricated by molding and heat curing liquid vinyl into flexible members 1½ inches in diameter, approximately 8 inches long, and having ½ inch steel shafts 74 embedded therein. Pins 76 are also molded within the body members during this process.

As can be seen in FIG. 5, a V-shaped space 85 is provided between shields 80 by virtue of the deflected body members 72 of picker tips 68, 70. Shields 80 prevent berries from being entangled between the converging forward ends of picker tips 68, 70, and thus most or all of the berries will be directed toward V-shaped space 85. The rotational direction of picker tips 68, 70 is such that the adjacent surfaces of picker tips 68, 70 are moving upwardly between V-shaped opening 85. Thus the berries are lifted upwardly and rearwardly by virtue of the helical ribs 84 on picker tips 68, 70.

A drive train is provided for moving the various moving parts of the device. The drive train includes a power take-off shaft 86 (FIG. 2) which is adapted to be connected to the power take-off 88 of a tractor. Shaft 86 drives a gear box 90 which includes a transverse output shaft 92 and a rearwardly extending output shaft 94. Brush 50 is driven by a belt 96 which is trained around a pulley 98 on transverse output shaft 92 and which is additionally trained around a pair of idler pulleys 100.

The means for driving conveyor belt 54 is not shown, but may be provided by connecting belts to roller 58 in any conventional manner. The means for rotating gears 78 of picker tips 68, 70 include a drive shaft 102 (FIGS. 1 and 3) which is driven by a belt 104 driven by a shaft 94. The lower end of shaft 102 includes a universal joint 106 and a pulley 108 (FIG. 1). Rotatably trained around pulley 108 and an additional pulley 110 is a belt 112 for driving at least one of gears 78 (see FIG. 5). Rotation of one gear 78 causes all the gears 78 to rotate in alternating directions by virtue of their innermeshing relationship.

In operation as the vehicle moves across the field, the shields 80 first encounter the fruit to be picked as shown in FIG. 2. The fruit is directed by shields 80 toward the V-shaped space 85 where it is encountered by the uprising ribs 84 of picker tips 68, 70. Ribs 84 cause the fruit to be lifted upwardly and rearwardly toward an inclined plane 114 (FIG. 3) which is at the lowermost end of conveyor belt 54. Brush 50 propels the fruit upwardly on inclined plane 114 onto conveyor belt 54 where it is carried rearwardly to the rear end of fuit harvesting machine 10. A hopper may be mounted at the rearward end of conveyor belt 54 for receiving the strawberries therein. While brush 50 is shown for moving the strawberries rearwardly onto conveyor belt 54, a fan may be used in the place of brush 50 so as to blow the strawberries from the picker tips 68, 70 up onto conveyor belt 54 with a minimum of damage. Furthermore, a blower 116 includes a conduit 118 which extends to the rearward end of conveyor belt 54 and which directs a stream of air rearwardly so as to blow the leafs away from the strawberries as the strawberries fall off the rearward end of conveyor belt 54. This is illustrated in FIG. 2.

Thus, as the fruit is encountered by helical ribs 84 in the space 85 between picker tips 68, 70, the fruit is detached from the stems. It is detached by the snapping and pitching action on fruit pedicels from the upward moving ribs 84 on picker tips 68, 70. Brush 50 is a soft nylon brush which pushes the fruit backward onto belt 54 for transportation to a fruit collection box at the rear of the vehicle (not shown). Separation of the debris from the fruit is accomplished by an air stream directed through the harvested material by flexible conduit 118 as it falls from the conveyor. Height control of the picker head is obtained by hydraulic adjustment cylinder 52 which permits frame 24 to be rotated about pivot axle 22.

Thus it can be seen that the device accomplishes at least all of its stated objectives.

We claim:

1. A device for harvesting fruit comprising,
a picker head frame having forward and rearward ends,
a forward frame member mounted on the forward end of said picker head frame,
a plurality of pairs of elongated picker tips, each of said pairs comprising first and second picker tips, each of said first and second picker tips having forward and rearward ends and a longitudinal axis,
each of said first and second picker tips comprising an elongated body member of elastic flexible material and having helical ribs formed on the outer surface thereof, the helical ribs of said first picker tip having a threaded direction opposite to said second picker tip,
first means on said forward frame member for rotatably mounting said picker tips in a side-by-side relation on said forward frame member for rotation about the said longitudinal axes of said picker tips, said first picker tips being rotated in a direction opposite to said second picker tips,
said pairs of picker tips being disposed on said forward frame member so that the said second picker tip of one pair of picker tips is adjacent to but spaced from the first picker tip in the adjacent pair of picker tips so as to define a V-shaped fruit receiving space therebetween.

2. The device of claim 1 wherein said first means further comprises a plurality of rigid support members mounted on said forward frame member, each of said support members being positioned between the said first and second picker tips of each pair of picker tips, each of said support members having rearward and forward ends, a shield means secured to the forward end of each of said support members, the forward ends of said first and second picker tips in each of said pairs of picker tips being rotatably mounted on said shield means so that the forward ends of said first and second picker tips are deflected towards one another to define said V-shaped space.

* * * * *